(12) United States Patent
Neuman

(10) Patent No.: US 9,338,496 B2
(45) Date of Patent: May 10, 2016

(54) SYSTEM AND METHOD SUPPORTING INFRARED REMOTE CONTROL OVER A NETWORK

(71) Applicant: Broadcom Corporation, Irvine, CA (US)

(72) Inventor: Darren D. Neuman, Palo Alto, CA (US)

(73) Assignee: BROADCOM CORPORATION, Irvine, CA (US)

( * ) Notice: Subject to any disclaimer, the term of this patent is extended or adjusted under 35 U.S.C. 154(b) by 12 days.

(21) Appl. No.: 14/014,729

(22) Filed: Aug. 30, 2013

(65) Prior Publication Data

US 2014/0233909 A1 Aug. 21, 2014

Related U.S. Application Data

(63) Continuation of application No. 10/116,217, filed on Apr. 4, 2002, now abandoned.

(51) Int. Cl.
| | |
|---|---|
| *H04N 7/18* | (2006.01) |
| *H04N 21/422* | (2011.01) |
| *H04L 12/28* | (2006.01) |
| *H04N 5/775* | (2006.01) |
| *H04N 9/87* | (2006.01) |
| *H04N 21/41* | (2011.01) |
| *H04N 21/426* | (2011.01) |
| *H04N 21/436* | (2011.01) |
| *H04N 21/637* | (2011.01) |
| *H04N 21/6587* | (2011.01) |

(52) U.S. Cl.
CPC ........ *H04N 21/42221* (2013.01); *H04L 12/282* (2013.01); *H04L 12/2803* (2013.01); *H04N 5/775* (2013.01); *H04N 9/87* (2013.01); *H04N 21/4135* (2013.01); *H04N 21/42646* (2013.01); *H04N 21/43615* (2013.01); *H04N 21/43622* (2013.01); *H04N 21/637* (2013.01); *H04N 21/6587* (2013.01); *G08C 2201/40* (2013.01)

(58) Field of Classification Search
CPC combination set(s) only.
See application file for complete search history.

(56) References Cited

U.S. PATENT DOCUMENTS

| | | | |
|---|---|---|---|
| 4,866,434 A | 9/1989 | Keenan | |
| 6,006,143 A | 12/1999 | Bartel et al. | |
| 6,097,520 A * | 8/2000 | Kadnier | 398/106 |
| 6,796,555 B1 * | 9/2004 | Blahut | 370/395.1 |
| 7,617,515 B1 * | 11/2009 | Laksono | 725/93 |
| 2001/0021305 A1 | 9/2001 | Sugiyama et al. | |
| 2002/0174444 A1 * | 11/2002 | Gatto et al. | 725/133 |
| 2003/0002521 A1 * | 1/2003 | Traversat et al. | 370/465 |
| 2003/0135859 A1 * | 7/2003 | Putterman et al. | 725/78 |

FOREIGN PATENT DOCUMENTS

| | | |
|---|---|---|
| EP | 0963877 | 12/1999 |
| GB | 2219164 | 11/1989 |
| WO | WO0013344 | 3/2000 |

* cited by examiner

*Primary Examiner* — Chenea Smith
(74) *Attorney, Agent, or Firm* — Foley & Lardner LLP; Christopher J. McKenna; Paul M. H. Pua

(57) ABSTRACT

The present invention relates to a system for wireless control of home media sources that utilizes a home digital network to transport packetized IR transmitter data to a remote location. The system allows for flexible control of multiple devices that accept IR commands without requiring additional wiring, and is independent of any particular IR protocol.

20 Claims, 10 Drawing Sheets

SYSTEM AND METHOD SUPPORTING INFRARED REMOTE CONTROL OVER A NETWORK

CROSS REFERENCE TO RELATED APPLICATIONS

This application is a continuation of U.S. patent application Ser. No. 10/116,217, filed Apr. 4, 2002, the entirety of which is hereby incorporated by reference.

BACKGROUND OF THE INVENTION

The development of home networks to distribute video content digitally presents new problems to system designers seeking to integrate the control of multiple devices in the home. An early example is the use of coaxial cable to distribute analog video content throughout a home. Although it was relatively easy to connect multiple televisions to a common video source such as a VCR located in a different room, the standard remote controls for the VCR would not allow a homeowner to directly control a remotely located VCR from the room where the TV was located, which is where the operator typically would desire to view the video. In prior analog systems, remote control of a source not located in the room where the content was played was accomplished with either UHF radio remote controls (an uncommon solution for home equipment and susceptible to interference from neighbors) or more typically with the use of infrared repeaters that would collect IR control signals in a given room and then either retransmit them by bouncing them down a hallway, send them by a dedicated wired connection to the program source, or retransmit the signals using radio waves, again suffering interference from other radio sources. All of these techniques require additional dedicated components and wiring making their installation relatively expensive.

There are also significant differences from control schemes using dedicated "home run" wiring. Usually, dedicated wiring control schemes must be wired from box-to-box separately from the wires used to carry the analog video/audio signal. The control wires can be used ONLY to carry command information. Dedicated wiring control schemes are proprietary and do not work with all IR remote controls (e.g., SONY S-link). They are usually based on decoding the IR signal, and only sending the control word. The invention described here does not require decoding the IR signal, but rather works by reconstructing the IR signal at the central box.

There are control schemes based on 1394 networks, however, they rely upon one box controlling another through known control word protocols, and do not seem capable of sending and reconstructing the original IR signal. As such, they do not work with existing IR remote controls, or existing A/V equipment. The invention disclosed here operates with existing A/V equipment, and it makes use of the home network and remote/central boxes to receive, communicate on home network, and finally reconstruct the original IR remote control signal, allowing for highly flexible control with a minimum of additional wiring while preserving the homeowner's investment in pre-existing A/V sources and displays.

Further limitations and disadvantages of conventional home A/V control approaches will become apparent to one of skill in the art, through comparison of such systems with the present invention as set forth in the remainder of the present application with reference to the drawings.

BRIEF SUMMARY OF THE INVENTION

Aspects of the present invention may be found in a home network system that is based on digital transmission. The system allows the user to send remote control commands across the home network, rendering unnecessary a physically separate control path for commands to the remotely located A/V source.

In one embodiment, the remote settop box (located with the TV, stereo speakers, PC, or other unit capable of playing or displaying an A/V program) is networked to a central settop box (located where the A/V source such as a VCR, DVD player, or file server is located). The network is any of Ethernet, HPNA, HCNA, wireless 802-11 or other digital network. The remote settop box can receive the infrared remote control signals, process them, construct packets of control information, and send the packets over the network to the central settop box. The central settop box can receive and decode the packets, and use an IR blaster to re-transmit the remote control signals into the room with the other AV equipment.

Such a system allows a user in the bedroom, for example, to use a normal IR remote control to turn on a VCR that is remote in the family room. The video signal would leave the VCR as an analog signal and be digitized and compressed by the central settop box, typically using an MPEG encoder. The VCR signal is then sent over the home network to the remote settop box in the bedroom. Control signals from the VCR IR remote are relayed from the remote settop box, over the digital network, and to the VCR, thus giving the user all the normal operations expected.

Alternatively, a small remote-only box can be placed on the network anywhere in the home where IR remote capability is needed. This would allow a remote to work totally independently of the location of the AV equipment. All that is required in this embodiment is an IR digitizer connected to the home network.

By taking advantage of the digital back channel available on the home network, a number of schemes that allow for the remote control using existing IR controls of A/V equipment are possible, without the disadvantages of prior schemes. Other aspects, advantages and novel features of the present invention, as well as details of an illustrated embodiment thereof, will be more fully understood from the following description and drawings, wherein like numerals refer to like parts.

DETAILED DESCRIPTION OF THE INVENTION

Figure 1:
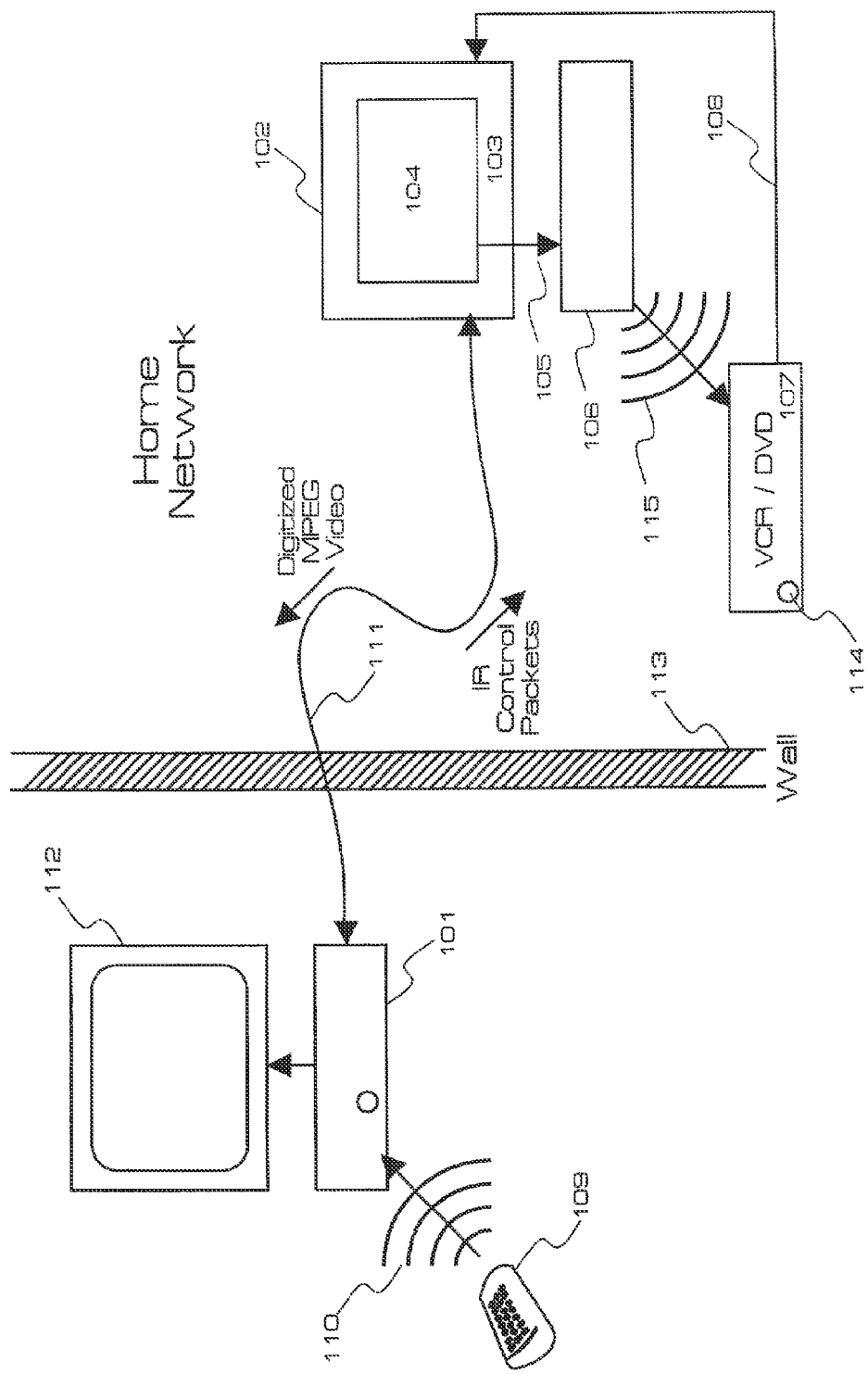
FIG. 1 shows an overview of a typical implementation of one embodiment the invention.

Referring to FIG. 1, in one embodiment of the invention, the home network system comprises 2 boxes: a remote settop box 101 and a central settop box 102. The central settop box 102 includes a home network interface 103 and an IR packet decoder 104, although these functions could be separated into two physically distinct units. An IR cable 105 connects the IR packet decoder to an IR Blaster 106, whose construction may be conventional. A program source such as a VCR 107 is connected to network interface 103 by either an analog or digital link 108. An IR remote control 109 can now send IR commands 110 to remote settop box 101. Remote settop box 101 packetizes the IR commands 110 and forwards them across digital network 111 to network interface 103. IR packet decoder 104 translates packetized IR commands received from the network 111 and forwards them to IR blaster 106. IR blaster 106 broadcasts an IR blaster command 115 to conventional program source 107. The program source 107 responds to the commands and sends its program content to the digital network 111 via link 108 and the network interface 103. Finally, the remote display or speakers 112 receives the program from source 107, even though source 107 may be separated from IR remote 109 and display 112 by one or more walls 113.

Remote Box.

Figure 4A:
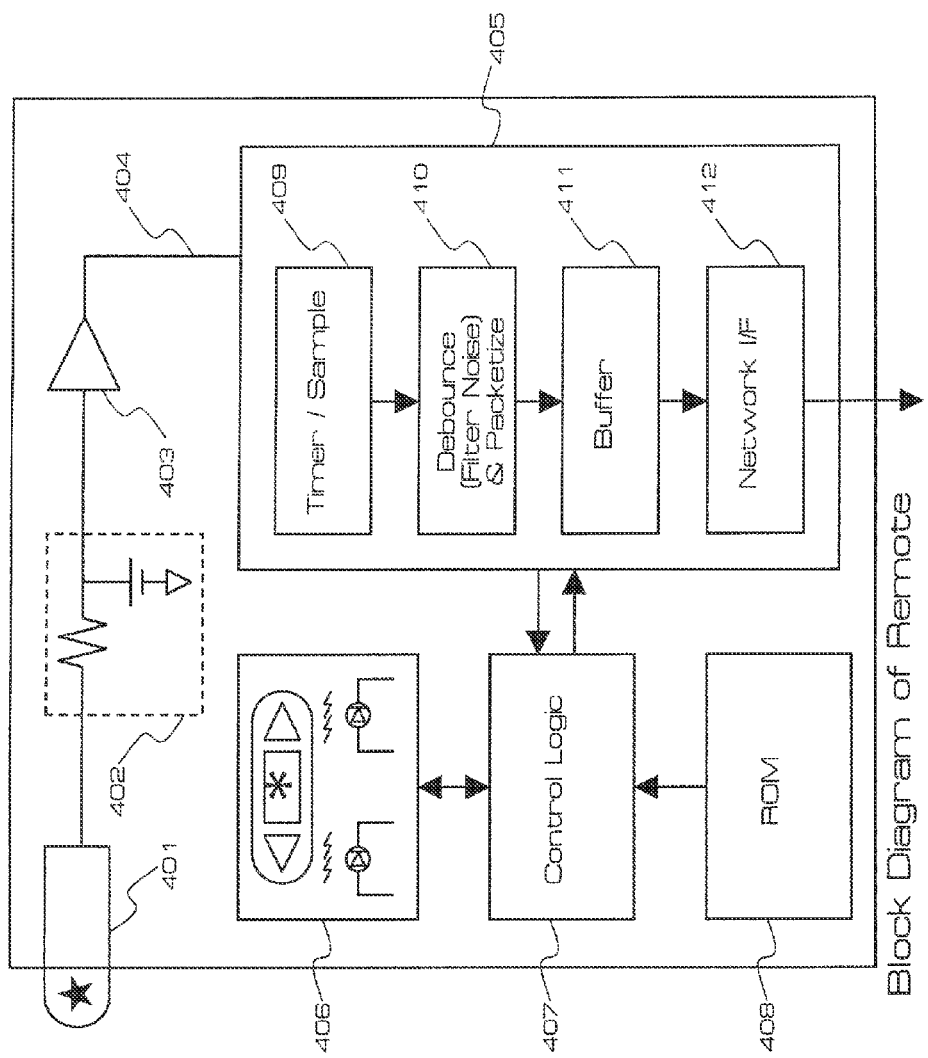
FIG. 4a is a block diagram of a remote settop box in accordance with one embodiment of the present invention.

FIG. 4a is a detailed view of the remote settop box 101. The IR receiver 401 within the remote box is typically a photodiode, with a simple RC filter 402 at the output. The RC filter 402 is sufficiently broadband to receive all varieties of IR remote control signals. Most IR remote controls 109 generate signals 110 that are either baseband signals with pulse widths in the range of 3-7 µs on/20 µs off or AM modulated carriers around 30-40 KHz. Buffer/amplifier 403 forwards the received signal to the remote signal processor 405 over interrupt line 404.

The signal 110 is received, digitized, and packetized efficiently for distribution over the home network. The remote signal processor 405 in the remote settop box may perform this function in a number of ways:

1. Programmed Remote: In this scheme, the user can program the remote settop box via a user interface 406 to identify the type of remote control in use. Different remote controllers use different protocols, and different transmission pulse widths/frequencies. The remote settop box control logic 407 can then use a signal processing scheme specifically designed for that remote by matching the received pattern with a known patterns stored in ROM 408, or trying alternate schemes until a scheme that works is selected. Usually, this consists of timing specific pulse widths, and demodulating a signal to decode digital bits. The sequence of digital bits contain remote control commands. In this scheme, only the decoded bits for the commands are sent over the network, resulting in very few bits transmitted, a few kilobits/second. This scheme has the advantages of being very immune to noise (some lights put off IR noise that can interfere), and has the advantage of consuming very few bits of network bandwidth.

2. Learned Remote: This scheme is very similar to the programmed remote scheme, however, rather than the user programming the type of remote from a user interface, the signal processor implements a learning algorithm by taking a sample remote control signal 110 from the user. For example, the user could place the system in 'learn mode', point the remote control at the receiver, and press the remote control buttons. The signal processor then only needs to match a received signal with a previously learned remote. It shares similar advantages as the programmed remote above.

3. Brute-force: In this scheme, the remote settop box simply samples the IR receiver at a very high frequency, and sends the information from every sample time across the network. Most IR receivers operate off a very high gain receiver, so as to receive weak signals, or signals of variable strength in a room. Because of this, the resulting IR signal is usually limited to either a 0 or 1 level, or may be digitized with very low quantization (4 bit quantization may be sufficient) with an ND converter. It is also not necessary to sample at a very high frequency, as most IR remote controls operate with low frequency signals. However, some remote controls save battery life by making pulse widths shorter. A typical system may sample the IR signal at 1 Mhz (1 µs period) with 4 bit quantization. This signal is then packetized, and sent across the network. The advantage of this system is that it will work with any remote control, regardless of the use of AM modulated carrier or baseband signal, as long as the bandwidth of the signal is less than 500 KHz. There are simple improvements on this scheme to save bandwidth, such as applying simple run-length compression or other lossless compression algorithms on the signal prior to transmission. Given that most IR pulses are much longer than 1 us, the signal should compress very well, on the order of 6-10× compression, reducing the network bandwidth to well below 1 Mbit/s.

Figure 8:
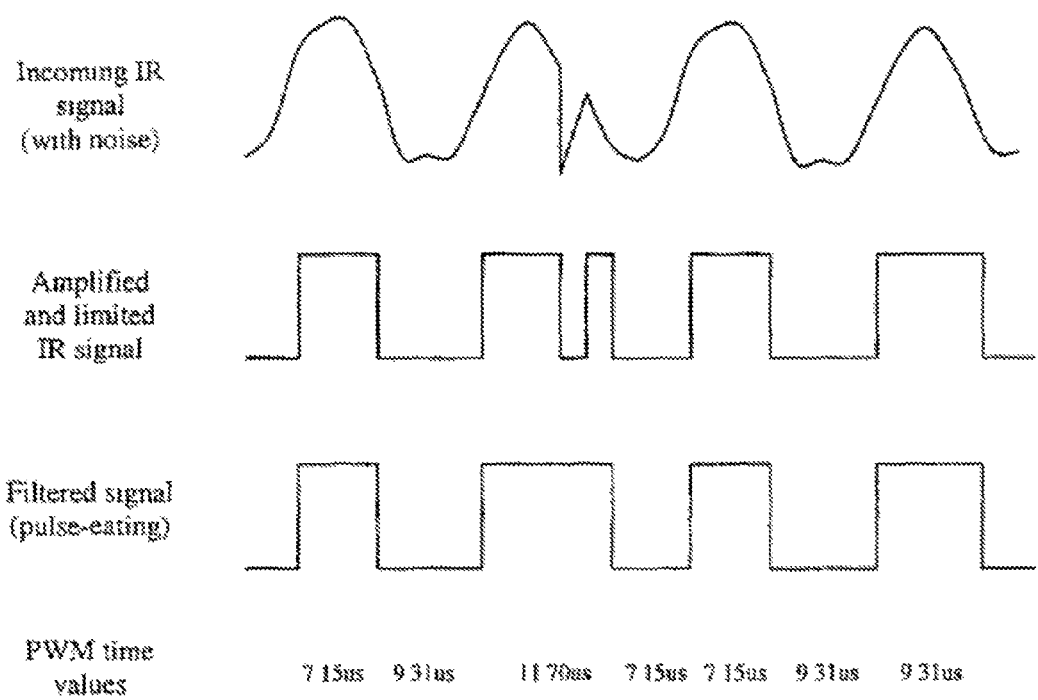
FIG. 8 illustrates examples of an incoming IR signal (with noise), an amplified and limited IR signal, and a filtered signal (pulse-eating).

4. PWM: This scheme takes advantage of the nature of remote control IR signals. All of these signals can be amplified to a very high level, resulting in essentially a stream of pulses of IR signal which are converted to 0-1 pulses of various width by sampling circuitry 409. At this point the signal has been converted to a pulse-width modulated signal. FIG. 8 shows an example of an incoming IR signal (with noise) and the amplified and limited IR signal after conversion.

The pulse width modulated signal can be filtered by pulse width coding circuit 410 to remove any pulses less than 1 µs in width (this is the lower limit of pulse widths used in remote control signals). As shown in FIG. 8, the filter removes the narrow pulse, and adds this time to the previous pulse width. The pulse width is measured with a high frequency clock, for example, 10 Mhz or 100 ns precision. PWM time values are indicated in FIG. 8 below the pulses of the filtered signal. The pulse width value is then coded as an 8 bit number, with some mechanism to encode very long periods of time with no change in level. This could be done by reserving the value 0 (0×00) to mean extend the pulse width count by 256. This very simple run-length coding could be improved with other simple data compression schemes. In this method, the bit rate on the network is usually very low, but could peak if there is a lot of IR noise in the system, or if the receiver is triggered by a high speed IR signal. The lower limit occurs if there is a slow IR signal, and is generally a single 8-bit number every 25.6 µs using a 10 Mhz sample clock, resulting in 312 Kbits/second. If there is no IR signal, the bandwidth is generally 0, as no information is sent. The upper limit occurs if there is a noisy signal received. Pulses just over 1 µs in length generally require an 8 bit number every 1 µs, or about 8 Mbits/second. This can be adjusted by making the sample clock longer, changing the filter characteristics of the pulse-eating filter, or by using entropy-coding of Huffman coding the pulse width signals. A peak data rate of 1 Mbit/second provides a reliable system that works with most commercially available remote controls. The advantages of this system is that it is independent of the protocol on the remote control, does not require a user to program the system, has some noise filtering and noise immunity, and requires no bandwidth when there is no IR signal received.

The Remote Network Interface.

The remote network interface 412 in the remote settop box 101 is controlled by a software application running on control logic 407 to manage this process over the network. It implements a number of functions, for example:

1. Establish connection with the application in the central settop box.

In one embodiment, on power-up, the remote settop box 101 sends a message to the central settop box 102 to establish an IR connection. This could also be done when the user selects such a feature on the remote settop box. This essentially allows the remote settop box IR application software to pass information to the central box, which is also running an IR application software. Additionally, after the connection is made, the remote settop box or the central settop box sends brief messages every few minutes to ensure that the other box is still connected. Upon discovering a disconnect, the remote and central boxes attempt to re-establish a connection, with time-out and retry if the other box is still disconnected.

2. Remove locally relevant IR signals for remote box and route to local processor.

The remote settop box may have it's own IR remote controller, and may process the commands from this controller. The control logic 407 examines the signal from the signal processor 405, determines if it matches the IR signal for the remote settop box control, and if so, does not transmit this on the network I/F 412. Instead it sends the resulting command to any local processor that may need to process commands for the remote box operation. This has at least two benefits: it allows the settop remote box to operate off the same IR receiver 401 as the network application, and also prevents retransmission of the local IR signal, thus allowing multiple remote settop boxes on a network, while preventing other similar boxes from receiving these signals inadvertently through the network 111. In one embodiment, any remote settop box needs to respond only to its IR control.

If a homeowner wants to have multiple identical remote settop boxes in a single network, and wants the ability to control any of them through the network 111, then the remote settop box 101 and the IR controller for that box are programmed so that each remote control will only work with a single box, for example. All other signals are routed on the network for use by other boxes.

3. Packetize IR signal from the signal processor (possibly with compression).

Figure 4B:
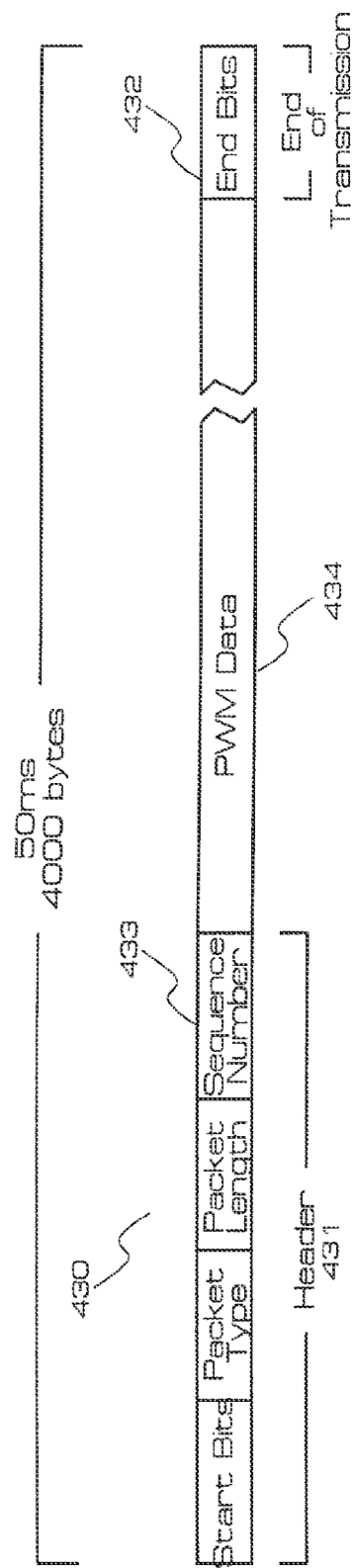
FIG. 4b is a logical diagram of the packet structure of packetized IR control data in accordance with one embodiment of the invention.

The IR application software constructs a packet of information 430 to be used by the central settop box. One embodiment of a packet structure is shown in FIG. 4b. This information starts with some header information, followed by a number of PWM samples 434. The header information 431 contains control bits to indicate the start of transmission (if the IR receiver was previously quiet) and end of transmission 432. The header indicates a packet length to allow the central box to know how much information is to be received. The header indicates a packet count or sequence number 433, which is simply an increment of +1 from the previous packet. Each packet in sequence has an increasing count. The count can be used by the central settop box to order the data, and allows simple buffering models (see below). Finally, the packets are a fixed, finite length of time. 50 ms covers most IR transmitter times for a single control code word. Using the PWM approach above, a 50 ms packet contains about 4000 bytes for typical IR codes with pulse periods of 25 μs or less if compression is used.

4. Buffer and time stamp data for transmission.

Figure 4C:
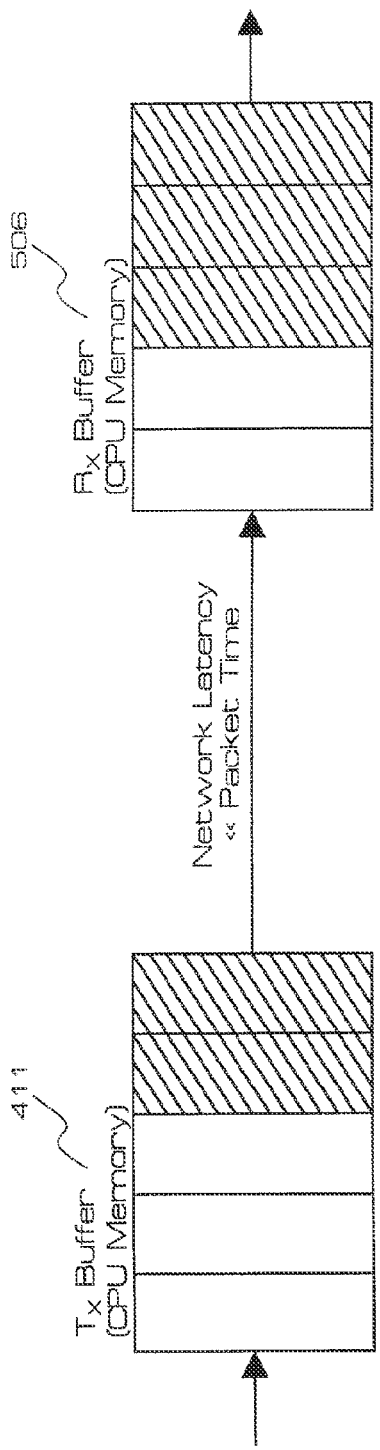
FIG. 4c illustrates one embodiment of a simple buffering scheme for use in sending and re-assembling IR control data packets.

In one embodiment, the data that is transmitted is buffered prior to transmission, and buffered on receipt. FIG. 4c shows one embodiment of how packets are "bundled" for network transmission. This ensures that the data is transmitted without gaps on the network. The network is typically packet based, and may have other information traffic. The resulting effect is that packets of IR information are not sent continuously. By using a buffer 411 on the transmitter side, and on the receiver side 506, the network delivery time does not affect the system operation. The buffer model can be very simple. For example, the system could buffer 4 packets on the transmit side, not start transmitting until 4 packets are available to send, and use 4 packets on the receiver side, while holding IR data at the central settop box until 4 packets are received. After the startup condition, packets are generated every 50 ms in the remote settop box 101 and consumed in the central settop box 102 every 50 ms, so the system works as long as the data is sent within 4×50 ms or about 200 ms. As most IR remote controls 109 repeat the IR signal multiple times, the system is not sensitive to occasional network drop-outs.

5. Ensure low delay operation (numbered packets to assemble sequence).

In one embodiment, low delay operation ensures that the user does not perceive annoying delays from when they push a button on an IR remote until the operation starts to take effect. This may be achieved by two means. For example, first the data is sent to the network while the button is still being pressed. A typical key press may last a few seconds, and the signal processing and application software must not wait until the button press is complete to send data packets 430. Second, the buffer model for buffer 411 keeps a small number of packets of information in the buffer to ensure low delay from input (IR received at remote box) to output (IR blasted at central box). The buffer model above uses 8 packets of 50 ms each for a 400 ms total delay. This may be modified for different system performance goals.

Figure 2:
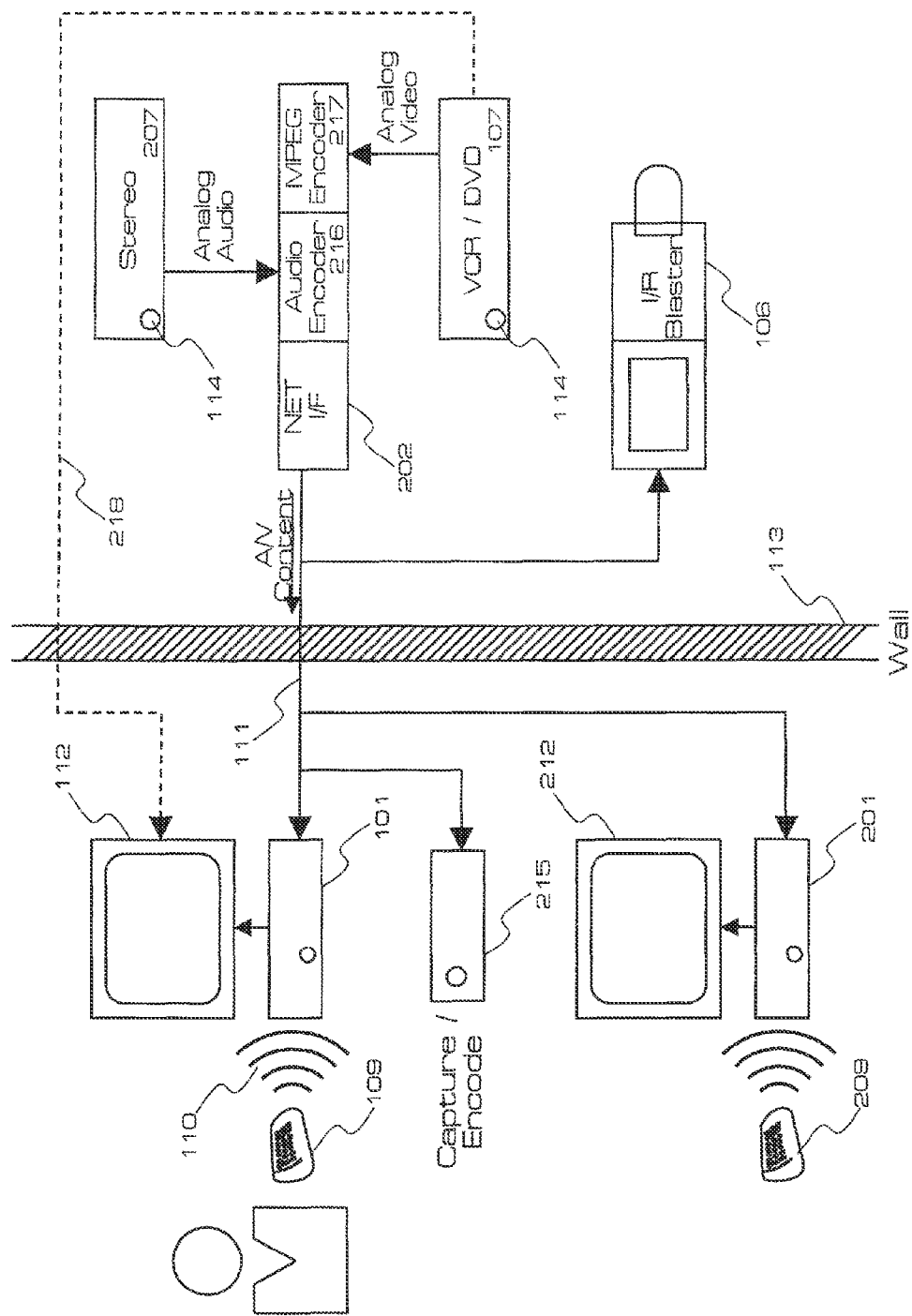
FIG. 2 is a more detailed overview showing the basic system and an alternate scheme for use with A/V sources that are not connected to the digital home network.

FIG. 2 shows a variation on the basic system embodiment shown in FIG. 1. In this embodiment, multiple remote settop boxes 101, 201 and program sources 107, 207 are connected to network 111. A stand-alone remote capture device 215 can be positioned at any convenient point on network 111 so that IR remotes 109, 209 can be used in any room, even rooms that contain no program sources 107, 207 or display or speaker devices 112, 212. Home digital network interface 202 is conventional and has digitizing ports for digitizing and forwarding digital audio 216 and video 217 across network 111.

Furthermore, from FIG. 2 it can be seen that the remote IR control across the digital home network can be accomplished even for program sources that are not connected to the network, since source 107 in FIG. 2 can receive IR commands through its IR receiver 114 and send analog output to the display device via a "homerun" connection 218 (such as ordinary coaxial cable or S-video) to display device 112.

Figure 3:
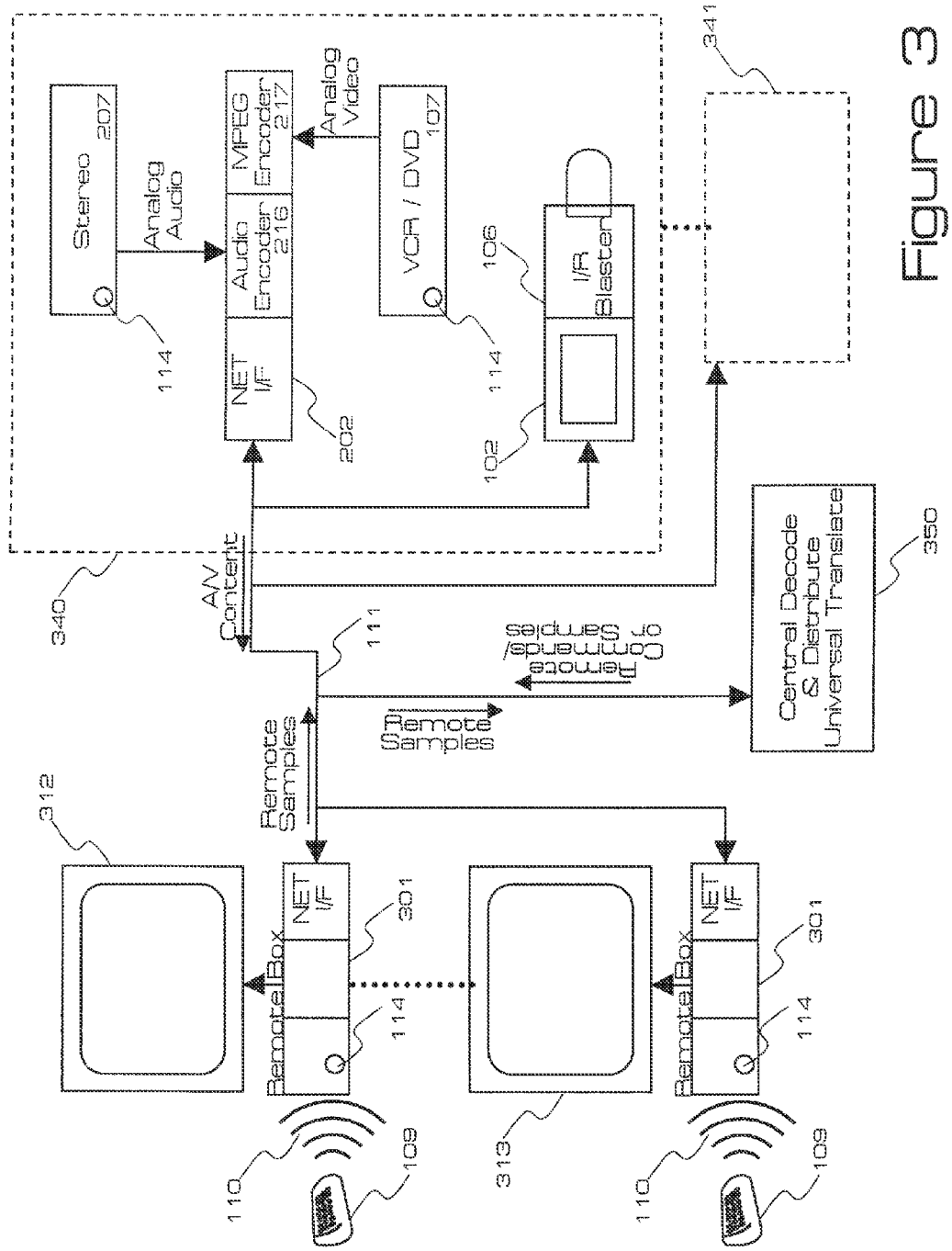
FIG. 3 is an alternate embodiment that includes a central decode and command distributor that allows multiple display media to share multiple program sources.

FIG. 3 shows another embodiment of a system arrangement in accordance with the present invention. In this scheme, the functions of remote settop box 301 are built into display device 312, or may be as in FIG. 1. Multiple display devices 312, 313 are connected to network 111. Furthermore, multiple clusters of program sources 340, 341 are also connected to the network. Central decode and distribute device 350 manages connections between the remote settop boxes and different media clusters, so that multiple remotes and sources can be accessed simultaneously.

Figure 5:
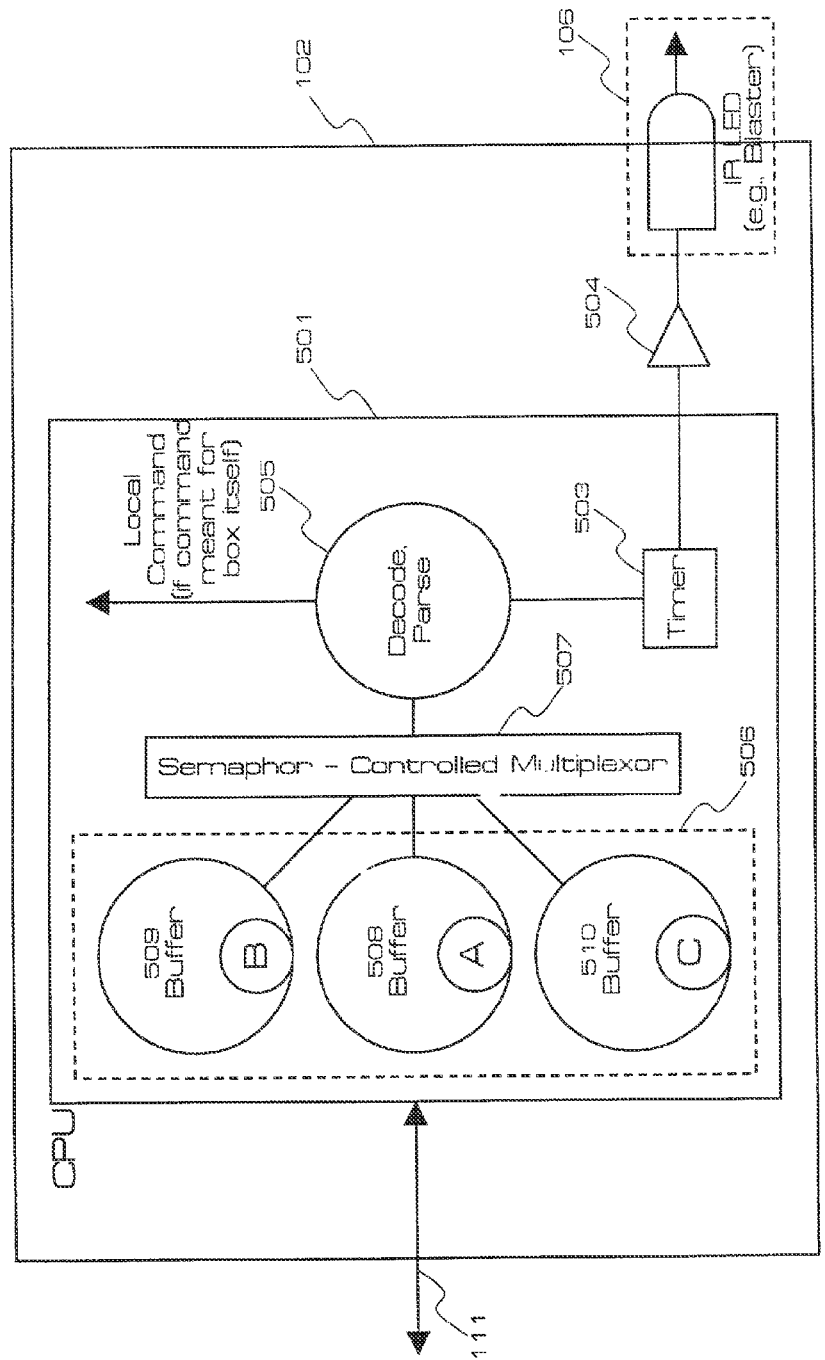
FIG. 5 is a block diagram of a central settop box in accordance with one embodiment of the present invention.

Central Settop Box:

One embodiment of the central settop box is shown in FIG. 5. The IR blaster 106 is typically an LED. In FIG. 5 it is shown as part of the settop box, although it could be located remotely in a convenient transmitting location, high on a wall for example. Most IR remote controls are either baseband signals with pulse widths in the range of 3-7 µs on/20 µs off or AM modulated carriers around 30-40 KHz. The packets are received from the network 111, depacketized, processed and driven to the IR blaster 106. The IR blaster 106 will transmit the signal into the room, where it will bounce off objects and reflect back into the A/V equipment 107 in the room.

The central signal processor 501 in the central settop box is generally more complex than the remote settop box. Signal processor 501 is implemented on a microprocessor with the functions described below. It takes the packets of data 430 from the network 111, decodes the data according to the algorithm chosen, and using a time base similar to the remote settop box, reconstructs the original signal. An example would be using the PWM method described above, decompressing the values if entropy coding or Huffman coding was used to compress the signal in the remote settop box 101. After decompression, a 10 Mhz clock 503 counts out the relevant clock cycles to recreate the pulse width of the signal, and the output of the pulse counter drives the LED either on or off via a driver 504 (full power) into the room.

The central settop box also runs a software application that manages the system over the home network. The operations are, for example:

1. Establish connection with remote boxes. This is different than above, as the central settop box "pings" the network 111 to find if any remote boxes have been powered up. It does this on a regular period, on the order of one second to one minute. It also establishes separate connections with each remote settop box, and maintains separate connection information. This supports multiple remote settop boxes in a home, since each may use different A/V equipment in the central location.

2. De-code and parse information received on the network. Decode and parse routine 505 examines the header information 431, and if a new IR signal is being started, creates buffer space for the receipt of the signal. The routine 505 examines the packet count 433, and if packets are lost or received out of order, they are reordered properly in the buffer, or re-re-quested from the remote settop box. Routine 505 starts the signal processing and IR blaster after a minimum number of packets have been received. The central settop box waits for a few packets to arrive to ensure that the buffer 506 does not underflow during an IR event. In one embodiment, 4 packets is the minimum number of packets that are received and present in buffer 506 before processing begins. Buffering ends when the header 432 indicates the end of IR signal reception.

3. Maintain separate buffers for each remote settop box. Semaphore control is maintained over the IR blaster 106 and signal processing. The IR blaster is a shared resource, so it is generally controlled carefully. When a network packet 430 is received from a remote settop box 101, it requests a path through multiplexer 507 by setting a "semaphore" for its buffer. If a later network packet is received from a remote box 201, the buffer 509 or 510 should fail to receive the semaphore and control over the IR blaster. Remote box 101 maintains control over the IR blaster through buffer 508 until the entire IR signal is received on the network, buffered, depacketized, and sent out the IR blaster output. Signals from other settop boxes can be held in buffers 509 and 510. Further, there is generally a dead time on the order of 100 ms or more after remote box 101 finishes, before remote box 201 is allowed to gain the semaphore and buffer 509 or 510 is released to the IR blaster. This dead time allows the A/V equipment 107 to clearly delineate the end of the IR command, and not confuse the following signal with the previous signal. After this dead time, the buffered packets received from remote box 201 are processed and sent to the IR blaster. While any remote settop box has control of the semaphore and IR blaster, all other packets from other remote boxes are buffered up in the receive buffer 506, but are not be processed. This ensures that a single IR signal is sent completely before another signal is sent in the event that multiple remote controls are used in different rooms at the same time.

Figure 6:
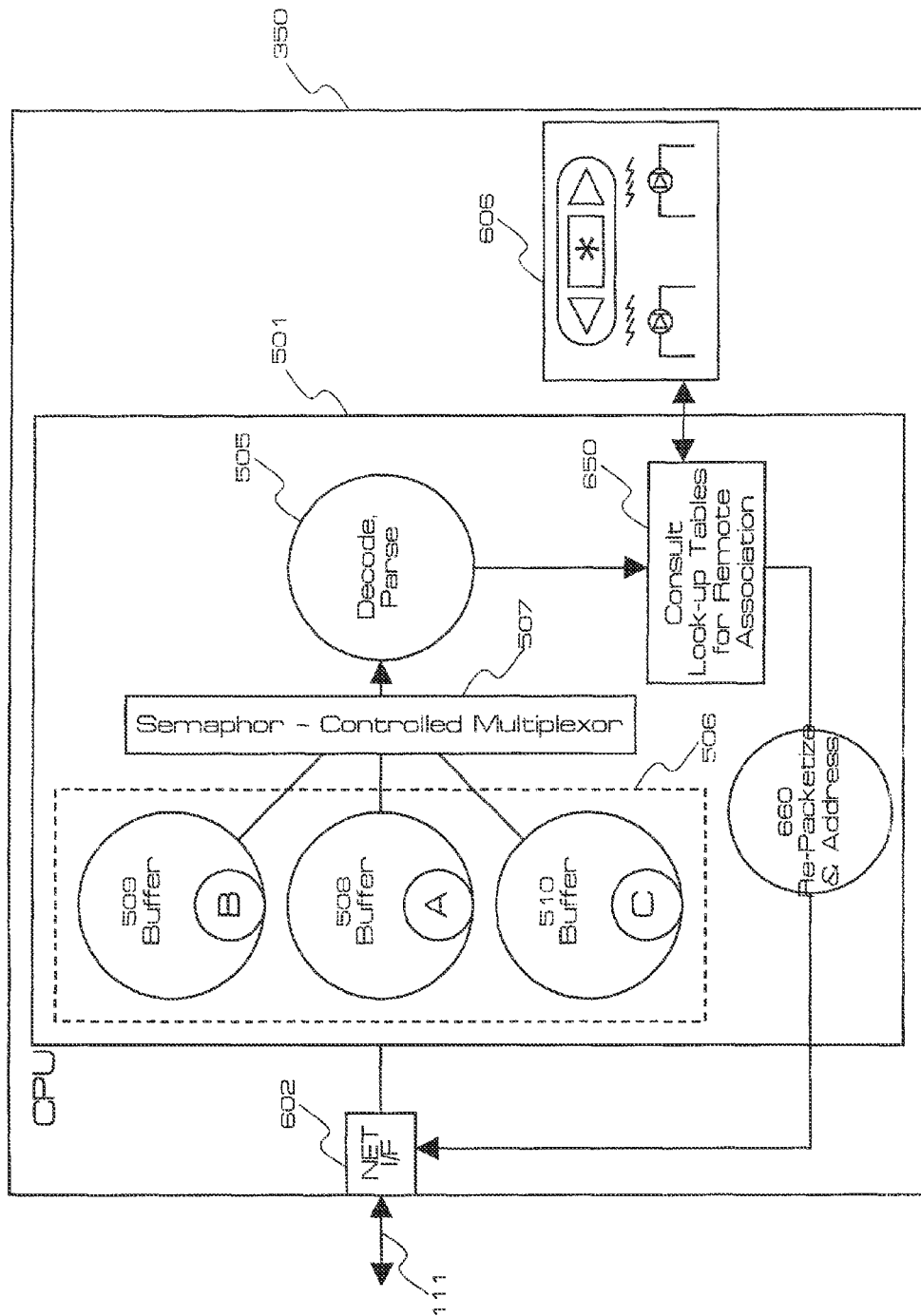
FIG. 6 is a block diagram of one embodiment of a central decode and command distributor for use with the system of FIG. 3, for example.
Figure 7:
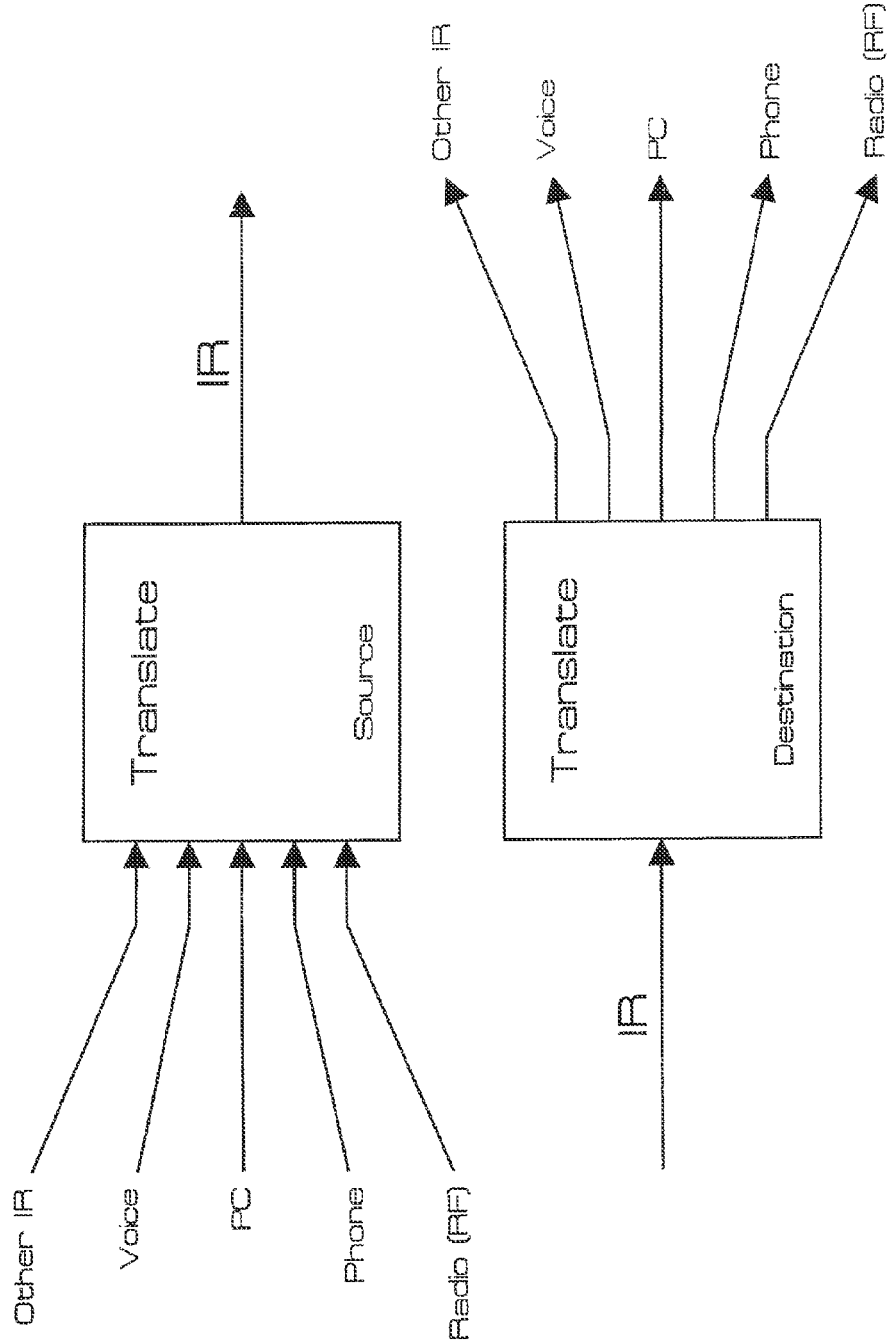
FIG. 7 is a diagram of a logical translation function wherein the system of FIG. 3 can be adapted to control devices other than A/V sources.

FIG. 6 shows a "central decode and universal translate" device that can be used with the system shown in FIG. 3, for example. This device may have all of the functions of the central signal processor 501, except instead of converting packets into IR signals, the converted packets are examined for header information that identifies the appropriate program source and remote for each packet. This device can be connected to network 111 at any convenient point through network interface 602. The packets are then routed to the appropriate media source cluster 340. This is possible since the central decoder 350 is made "aware" of which remotes are associated with each source via user input from interface 606. A look-up table 650 correlates each remote 109 with each source 107 or media cluster 340. Each packet is then appropriately addressed by re-packetizer 660 and sent back across the network 111. By using this central universal translate, the "any to any" IR control shown in FIG. 7 can be accomplished.

While there may be other choices for sample rates, packet size, buffer models, these are easily changed in the implementation, and can be optimized for the best quality operation while utilizing the lowest bandwidth. Different systems may prefer higher noise immunity and trade off bandwidth if the system network 111 uses 100 Mbit Ethernet, while another system may sacrifice noise sensitivity for bandwidth if using 20 Mbit HPNA or 10 Mbit Ethernet.

Embodiments of the present invention are quite different than known systems that utilize convention radio retransmission of IR signals. Notably, the system described here has at least the following advantages:

Single network connection to systems already exists with the home network used to transmit digital video.

Minimal additional cost when integrated into a settop box.

Compatible with multiple remote controls operating simultaneously in a single home.

Not susceptible to radio interference from within the home, or from neighbors.

Compatible with multiple sources (multiple remote boxes) within a single home.

The foregoing description is representative, however variations will be apparent to those of skill in the art and the invention is in no way limited to the specific example described.

Therefore, at least the following is claimed:

1. A home media network system, comprising:

a remote settop box operatively coupled to a home network, the remote settop box configured to receive a command signaling in a first wireless format for a program source remotely located from the remote settop box, and transmit the command signaling in a second wireless format responsive to receiving the command signaling in the first wireless format;

a central settop box operatively coupled to the home network and remotely located from the remote settop box, the central settop box configured to reconstruct the command signaling into the first wireless format responsive to the central settop box receiving the command signaling in the second wireless format via the home network, and transmit the command signaling reconstructed in the first wireless format; and the program source configured to receive the command signaling reconstructed in the first wireless format, wherein the central settop box is configured to provide media content from the program source to the remote settop box in response to the command signaling.

2. The home media network system of claim 1, wherein the remote settop box is configured to transmit the command signaling in the second wireless format to the central settop box, the command signaling corresponding to a user command received from a wireless remote control associated with the remote settop box.

3. The home media network system of claim 2, wherein the remote settop box is configured to receive the user command from the wireless remote control, and generate the command signaling in the second wireless format, the second wireless format comprising a format compatible with the home network.

4. The home media network system of claim 1, wherein the first wireless format comprises one of a plurality of formats supported by the remote settop box and the central settop box.

5. The home media network system of claim 1, wherein the remote settop box is configured to identify a type of remote control device that generated the command signaling received by the remote settop box.

6. The home media network system of claim 1, wherein the program source is located proximate to the central settop box.

7. The home media network system of claim 1, wherein the remote settop box is configured to identify that the command signaling received at the remote settop box uses a first protocol of a plurality of protocols.

8. The home media network system of claim 1, wherein the central settop box is configured to reconstruct the command signaling by examining the command signaling received at the central settop box.

9. The home media network system of claim 1, further comprising a second remote settop box operatively coupled to the home network, where the central settop box is configured to provide media content from the program source to the second remote settop box in response to command signaling received from the second remote settop box via the home network.

10. The home media network system of claim 1, further comprising a plurality of remote settop boxes operatively coupled to the home network, each of the plurality of remote settop boxes having an associated wireless remote control.

11. A method, comprising:
receiving, by a central settop box, command signaling in a second wireless format for a program source, from a remote settop box via a home network, the command signaling associated with a user request to access media content of the program source and received by the remote settop box in a first wireless format;

reconstructing, by the central settop box, the command signaling into the first wireless format responsive to receiving the command signaling in the second wireless format;

forwarding the command signaling reconstructed into the first wireless format to the program source; and transmitting the media content from the program source to the remote settop box via the home network.

12. The method of claim 11, wherein the command signaling received by the remote settop box in the first wireless format corresponds to a user command received from a wireless remote control associated with the remote settop box.

13. The method of claim 11, wherein the remote settop box is configured to identify a type of remote control device that generated the command signaling received by the remote settop box.

14. The method of claim 11, further comprising buffering the packetized command signaling in the second wireless format.

15. The method of claim 11, comprising:
receiving packetized command signaling from a plurality of remote settop boxes via the home network; and
identifying the source of the command signaling based upon the packetized command signaling.

16. A central settop box, comprising:
a network interface configured to receive command signaling in a second wireless format from a remotely located settop box via a home network, the command signaling associated with a user request to access media content of a program source and received by the remotely located settop box in a first wireless format for a program source;

signal processing circuitry configured to reconstruct the command signaling into the first wireless format responsive to receiving the command signaling in the second wireless format, and transmit the command signaling reconstructed in the first wireless format to the program source; and an encoder configured to encode the media content for transmission to the remotely located settop box via the home network.

17. The central settop box of claim 16, wherein the command signaling in the second wireless format comprises packets in a format compatible with the home network.

18. The central settop box of claim 16, wherein the remote settop box is configured to identify a type of remote control device that generated the command signaling received by the remote settop box.

19. The central settop box of claim 16, wherein the signal processing circuitry is further configured to establish a separate home network connection with the remotely located settop box in response to detecting that the remotely located settop box has been powered up.

20. The central settop box of claim 19, wherein the signal processing circuitry is configured to establish a separate home network connection for each of a plurality of remotely located settop boxes that have been detected.

* * * * *